United States Patent
Lin et al.

(10) Patent No.: US 11,822,412 B2
(45) Date of Patent: Nov. 21, 2023

(54) POWER CONSUMPTION REGULATION AND CONTROL METHOD, APPARATUS AND DEVICE, AND READABLE STORAGE MEDIUM

(71) Applicant: INSPUR SUZHOU INTELLIGENT TECHNOLOGY CO., LTD., Jiangsu (CN)

(72) Inventors: Kaizhi Lin, Jiangsu (CN); Yang Yang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/016,587

(22) PCT Filed: Apr. 26, 2021

(86) PCT No.: PCT/CN2021/089912
§ 371 (c)(1),
(2) Date: Jan. 17, 2023

(87) PCT Pub. No.: WO2022/052479
PCT Pub. Date: Mar. 17, 2022

(65) Prior Publication Data
US 2023/0213994 A1 Jul. 6, 2023

(30) Foreign Application Priority Data
Sep. 11, 2020 (CN) .......................... 202010956191.4

(51) Int. Cl.
*G06F 1/3206* (2019.01)
(52) U.S. Cl.
CPC .................. *G06F 1/3206* (2013.01)
(58) Field of Classification Search
CPC .................................................. G06F 1/3206
See application file for complete search history.

(56) References Cited

U.S. PATENT DOCUMENTS

2014/0067139 A1* 3/2014 Berke ....................... G06F 1/26
700/291
2015/0177811 A1 6/2015 Bose et al.
(Continued)

FOREIGN PATENT DOCUMENTS

| CN | 111309480 A | 6/2020 |
| CN | 111414070 A | 7/2020 |
| CN | 112114650 A | 12/2020 |

OTHER PUBLICATIONS

PCT/CN2021/089912 international search report.

*Primary Examiner* — Gary Collins
(74) *Attorney, Agent, or Firm* — IPro, PLLC (57) ABSTRACT

A power regulation and control method, apparatus and device, and a readable storage medium. The method disclosed in the present application includes: in response to a node power value of an artificial intelligence (AI) computing node being greater than a warning power value, acquiring, by a baseboard management controller (BMC), chip power values of computing chips in the AI computing node; obtaining a grouping result by grouping, according to the chip power values of the computing chips, the computing chips; and in response to the node power value being greater than a power capping value, querying a power regulation and control policy corresponding to the grouping result, and regulating power limit values of the computing chips according to the power regulation and control policy, such that a sum of all the power limit values is in a target range, where the warning power value is less than the power capping value, the power regulation and control policy is preset on the basis of the target range, and the target range is used for regulating and controlling energy efficiency values of the computing chips in the AI computing node.

15 Claims, 6 Drawing Sheets

(56) References Cited

U.S. PATENT DOCUMENTS

2017/0185132 A1* 6/2017 Bodas ................ G06F 11/3062
2020/0081513 A1* 3/2020 Lee .......................... G05F 1/66
2021/0365301 A1* 11/2021 Rao ...................... G06F 3/0605

* cited by examiner

POWER CONSUMPTION REGULATION AND CONTROL METHOD, APPARATUS AND DEVICE, AND READABLE STORAGE MEDIUM

CROSS-REFERENCE TO RELATED APPLICATION

The present application claims priority to the Chinese patent application No. 202010956191.4, entitled "POWER REGULATION AND CONTROL METHOD, APPARATUS AND DEVICE, AND READABLE STORAGE MEDIUM", filed on Sep. 11, 2020 before the CNIPA, China National Intellectual Property Administration, the entire contents of which are incorporated herein by reference.

TECHNICAL FIELD

The present application relates to the technical field of computers, and in particular to a power regulation and control method, apparatus and device, and a readable storage medium.

BACKGROUND

At present, power of a traditional rack-mounted server may be regulated and controlled in an operating system (OS) in-band way. Regulation and control for the power of the traditional rack-mounted server mainly lie in regulation and control for an internal memory, a central processing unit (CPU), a fan, etc. in the server. The total power of these components accounts for a larger part of the power of the entire server, and therefore, the power of the server may be regulated and controlled by regulating and controlling the power of these components.

In an artificial intelligence (AI) computing node, power of computing chips accounts for a larger part of power of the entire AI computing node, while power of the internal memory, the CPU, the fan, etc. accounts for a smaller part of the power of the entire AI computing node. Therefore, the power of the AI computing node can not be effectively regulated and controlled by regulating the power of the internal memory, the CPU and the fan in the AI computing node. It is clear that an existing way for regulating and controlling the power of the server is not applicable to the regulation and control of the AI computing node.

Therefore, the problem to be solved by those skilled in the art is how to regulate and control the power of the AI computing node.

SUMMARY

In view of this matter, an objective of the present application is to provide a power regulation and control method, apparatus and device, and a readable storage medium to regulate and control power of an AI computing node. Specific solutions thereof are described as follows.

In a first aspect, the present application provides a power regulation and control method, including:

in response to a node power value of an artificial intelligence (AI) computing node being greater than a warning power value, acquiring, by a baseboard management controller (BMC), chip power values of computing chips in the AI computing node;

obtaining a grouping result by grouping, according to the chip power values of the computing chips, the computing chips; and in response to the node power value being greater than a power capping value, querying a power regulation and control policy corresponding to the grouping result, and regulating power limit values of the computing chips according to the power regulation and control policy, such that a sum of all the power limit values is in a target range, where the warning power value is less than the power capping value, the power regulation and control policy is preset on the basis of the target range, and the target range is used for regulating and controlling energy efficiency values of the computing chips in the AI computing node.

In some embodiments, before acquiring, by a baseboard management controller (BMC), chip power values of computing chips in the AI computing node, the method further includes:

monitoring, by the BMC, the node power value in real time, and in response to the node power value being greater than the warning power value, starting a power regulation and control function.

In some embodiments, the monitoring, by the BMC, the node power value in real time includes:

controlling the BMC to monitor the node power value through a power management bus (PMBUS).

In some embodiments, the acquiring, by a baseboard management controller (BMC), chip power values of computing chips in the AI computing node includes:

obtaining respective chip power values by reading current values of the computing chips in the AI computing node by the BMC.

In some embodiments, the obtaining a grouping result by grouping, according to the chip power values of the computing chips, the computing chips includes:

obtaining the grouping result by grouping, according to a grouping instruction obtained, the computing chips; or acquiring an optimal power value in the target range, dividing computing chips with chip power values greater than the optimal power value into a first group, dividing computing chips with chip power values less than or equal to the optimal power value into a second group, and taking the first group and the second group as the grouping result; or acquiring an optimal power value in the target range, determining a buffer section having the optimal power value served as a mid-value, dividing computing chips with chip power values that are not in the buffer section and are greater than the optimal power value into a first group, and dividing computing chips with chip power values that are not in the buffer section and less than or equal to the optimal power value into a second group;

calculating a first power gradient for the first group, a second power gradient for the second group, and chip power gradient for the computer chips in the buffer section; and calculating a first similarity between any one of the chip power gradients and the first power gradient and a second similarity between the chip power gradient and the second power gradient, in response to determining that the first similarity is greater than the second similarity, adding a computing chip corresponding to the chip power gradient into the first group, in response to determining that the first similarity is less than the second similarity, adding the computing chip corresponding to the chip power gradient into the second group, and taking the first group and the second group as the grouping result.

In some embodiments, the target range is determined by:

acquiring, by a performance benchmark test tool, energy efficiency values of any one of the computing chips in the AI computing node under different chip power values, wherein the computing chips in the AI computing node are identical;

calculating a ratio of each of the energy efficiency values to a thermal design power (TDP) energy efficiency value; and adding energy efficiency value corresponding to the ratio greater than a preset threshold into an energy efficiency regulation and control section, and determining chip power values corresponding to the energy efficiency regulation and control section as the target range.

In some embodiments, the computing chip is a graphics processing unit (GPU), a neural network processing unit (NPU), a field programmable gate array (FPGA) or an application specific integrated circuit (ASIC).

In a second aspect, the present application provides a power regulation and control apparatus, including:

an acquisition module, configured to, in response to a node power value of an artificial intelligence (AI) computing node being greater than a warning power value, acquire, by a baseboard management controller (BMC), chip power values of computing chips in the AI computing node;

a grouping module, configured to group the computing chips according to the chip power values of the computing chips to obtain a grouping result; and a regulation and control module, configured to, in response to the node power value being greater than a power capping value, query a power regulation and control policy corresponding to the grouping result, and regulate power limit values of the computing chips according to the power regulation and control policy, such that a sum of all the power limit values is in a target range, wherein the warning power value is less than the power capping value, the power regulation and control policy is preset on the basis of the target range, and the target range is used for regulating and controlling energy efficiency values of the computing chips in the AI computing node.

It may be known from the above-mentioned solution that the present application provides a power regulation and control method, including: in response to a node power value of an AI computing node being greater than a warning power value, acquiring, by a BMC, chip power values of computing chips in the AI computing node; grouping the computing chips according to the chip power values of the computing chips to obtain a grouping result; and under the condition that the node power value is greater than a power capping value, querying a power regulation and control policy corresponding to the grouping result, and regulating power limit values of the computing chips according to the power regulation and control policy, such that the sum of all the power limit values is within a target range, wherein the warning power value is less than the power capping value; and the power regulation and control policy is preset on the basis of the target range, and the target range is used for regulating and controlling energy efficiency values of the computing chips in the AI computing node.

In a third aspect, the present application provides a power regulation and control device, including:

a memory configured to store a computer program; and a processor configured to execute the computer program to implement the power regulation and control method described above.

In a third aspect, the present application provides a readable storage medium storing a computer program, wherein the computer program, when executed by a processor, implements the power regulation and control method described above.

According to solutions described above, the present application provides a power regulation and control method, including: in response to a node power value of an artificial intelligence (AI) computing node being greater than a warning power value, acquiring, by a baseboard management controller (BMC), chip power values of computing chips in the AI computing node; obtaining a grouping result by grouping, according to the chip power values of the computing chips, the computing chips; and in response to the node power value being greater than a power capping value, querying a power regulation and control policy corresponding to the grouping result, and regulating power limit values of the computing chips according to the power regulation and control policy, such that a sum of all the power limit values is in a target range, where the warning power value is less than the power capping value, the power regulation and control policy is preset on the basis of the target range, and the target range is used for regulating and controlling energy efficiency values of the computing chips in the AI computing node.

BRIEF DESCRIPTION OF THE DRAWINGS

To describe technical solutions in embodiments of the present application or the related art more clearly, the accompanying drawings required for describing the embodiments or the related art will be briefly introduced below. Apparently, the accompanying drawings in the following description only show the embodiments of the present application, and those skilled in the art may still derive other accompanying drawings from these accompanying drawings without creative efforts.

DETAILED DESCRIPTION

The technical solutions in the embodiments of the present application will be described clearly and completely below in conjunction with accompanying drawings in the embodiments of the present application. Apparently, the described embodiments are only a part of the embodiments of the present application, not all the embodiments. Based on the embodiments of the present application, all other embodiments obtained by those skilled in the art without creative work fall within the protection scope of the present application.

At present, an existing way for regulating and controlling power of a server is not applicable to the regulation and control of an AI computing node. In view of this matter, the present application provides a power regulation and control solution capable of regulating and controlling power of the AI computing node and guaranteeing the energy efficiency of the AI computing node.

Figure 1:
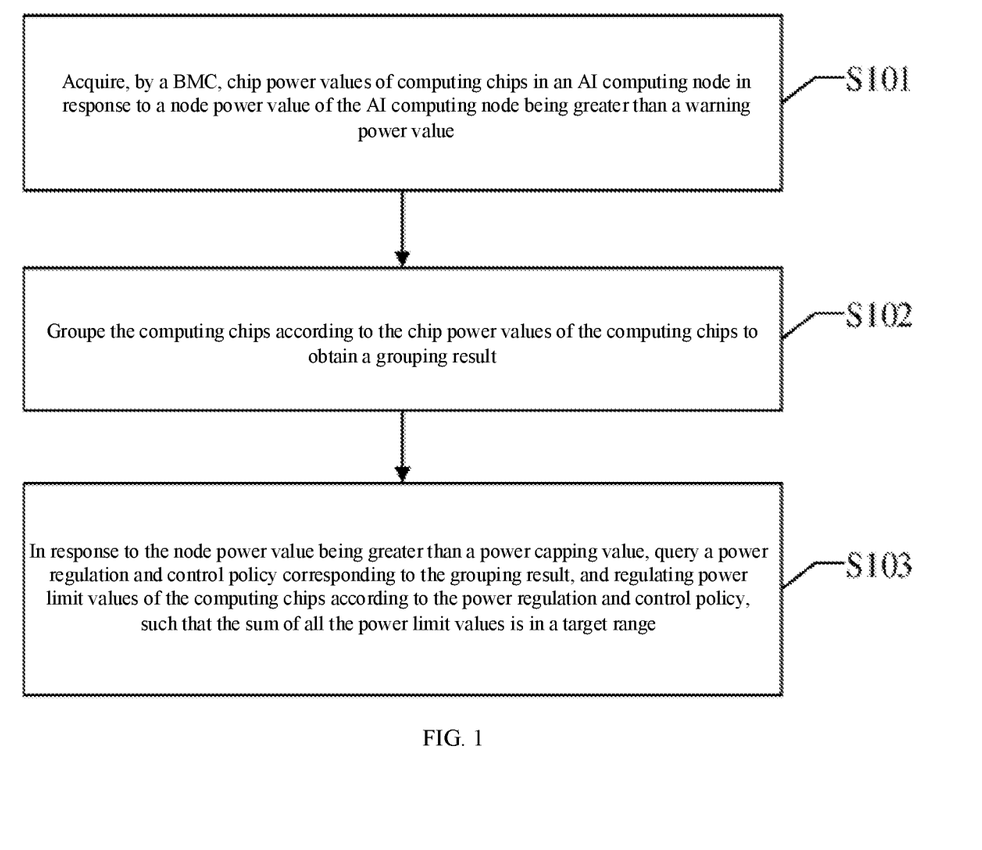
FIG. 1 is a flow chart of a power regulation and control method disclosed in the present application.

With reference to FIG. 1, an embodiment of the present application provides a first power regulation and control method including steps described below.

At S101, in response to a node power value of an AI computing node being greater than a warning power value, chip power values of computing chips in the AI computing node are acquired by a baseboard management controller (BMC).

Figure 2:
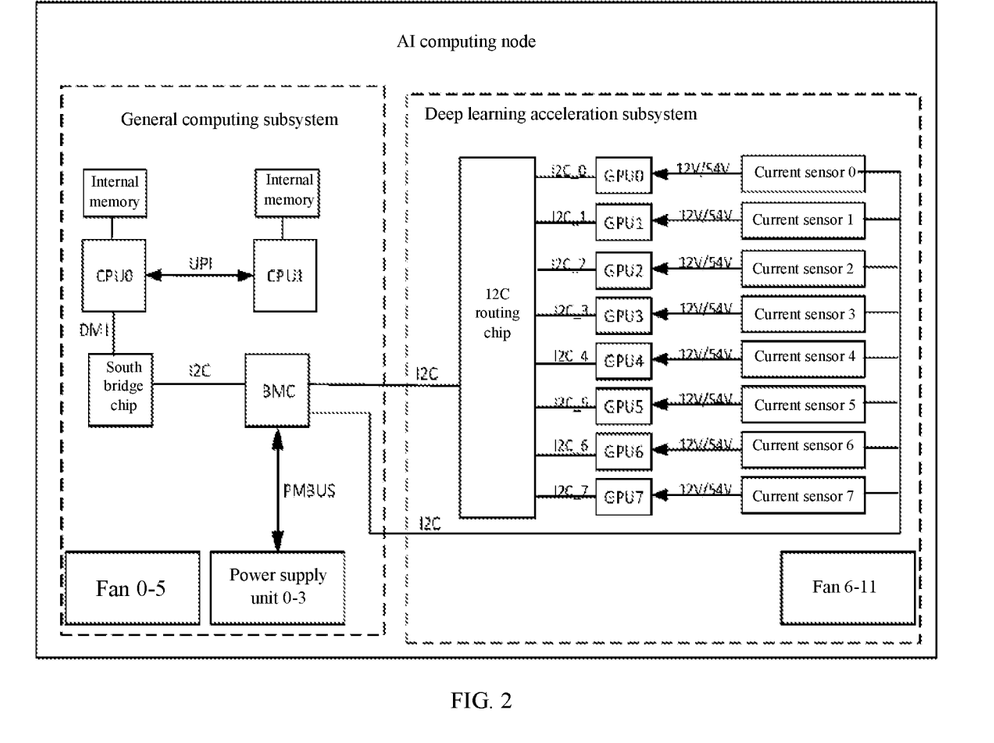
FIG. 2 is a schematic structural diagram illustrating an AI computing node disclosed in the present application.

It should be noted that the AI computing node is a device for running a certain machine learning algorithm, and it may be a device such as a server. The AI computing node generally includes a plurality of computing chips, and these computing chips are main power components of the AI computing node. In addition, other power components of the AI computing node are an internal memory, a CPU, a fan, etc. The structure of the AI computing node may refer to FIG. 2. In FIG. 2, a direct media interface (DMI) is a bus for connecting south and north bridges of a mainboard, and a communication manner between processors is the ultra path interconnect (UPI). An I2C routing chip is used for selecting a link where any one graphics processing unit (GPU) is located.

In some embodiments, before the chip power values of computing chips in the AI computing node are acquired by the BMC, the node power value is monitored in real time by the BMC, and in response to the node power value being greater than the warning power value, a power regulation and control function is started. At the moment, the power of the computing chips is monitored and collected firstly; and the warning power value is less than a power capping value. The node power value is monitored in real time by the BMC as follows: the BMC is controlled to monitor the node power value through a power management bus (PMBUS). The power value is acquired by the BMC in a out-of-band way, which may increase the efficiency.

Figure 3:
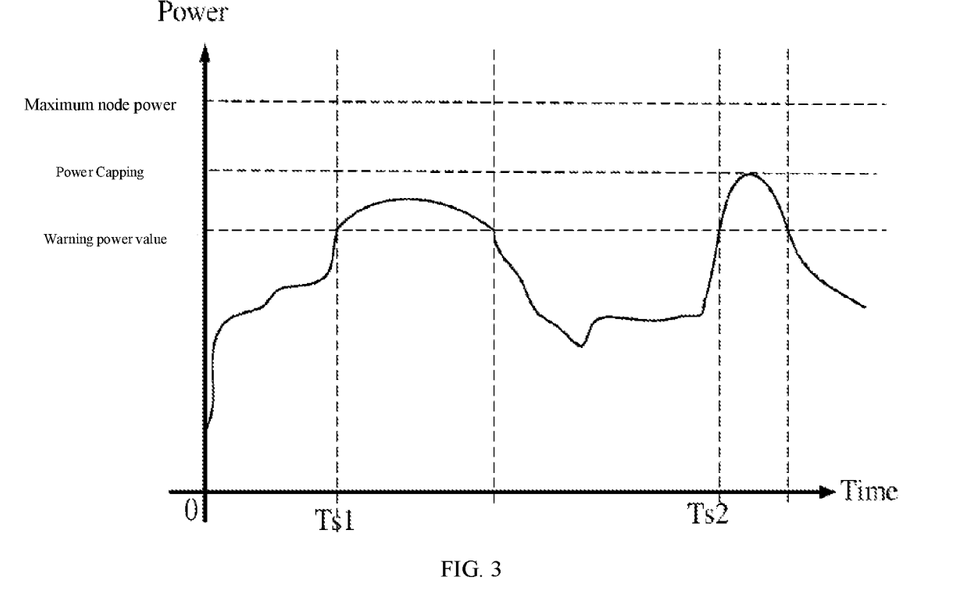
FIG. 3 is a schematic diagram illustrating a relationship among a warning power value, a power capping value and a maximum node power disclosed in the present application.

The node power value is an actual total power value of the AI computing node, the warning power value and the power capping value are both preset values, and a relationship among these values may refer to FIG. 3. In FIG. 3, the maximum node power is a total power value obtained when all components fully operate in the AI computing node, and therefore, it is the maximum value.

In some embodiments, the chip power values of computing chips in the AI computing node are acquired by the BMC as follows: current values of the computing chips in the AI computing node are read by the BMC to obtain the corresponding chip power values. The current values of the computing chips are values of current flowing through current sensors corresponding the computing chips and may be converted into corresponding chip power values. By acquiring the chip power values in such a way, frequent utilization of an inter-integrated circuit (I2C) bus is avoided, and working efficiencies of the computing chips cannot be affected. The I2C bus is a two-wire serial bus. It should be noted that not all the computing chips may support a way of directly reading the chip power values of the computing chips through the I2C, and therefore, the manner of acquiring the chip power values by reading the current values is a low-cost and universal power acquisition manner. Energy efficiency is a ratio of energy consumed by a device within unit time to a processed data volume, and has the unit of MB/s/watt.

At S102, the computing chips are grouped according to the chip power values of the computing chips, and a grouping result is obtained.

Figure 4:
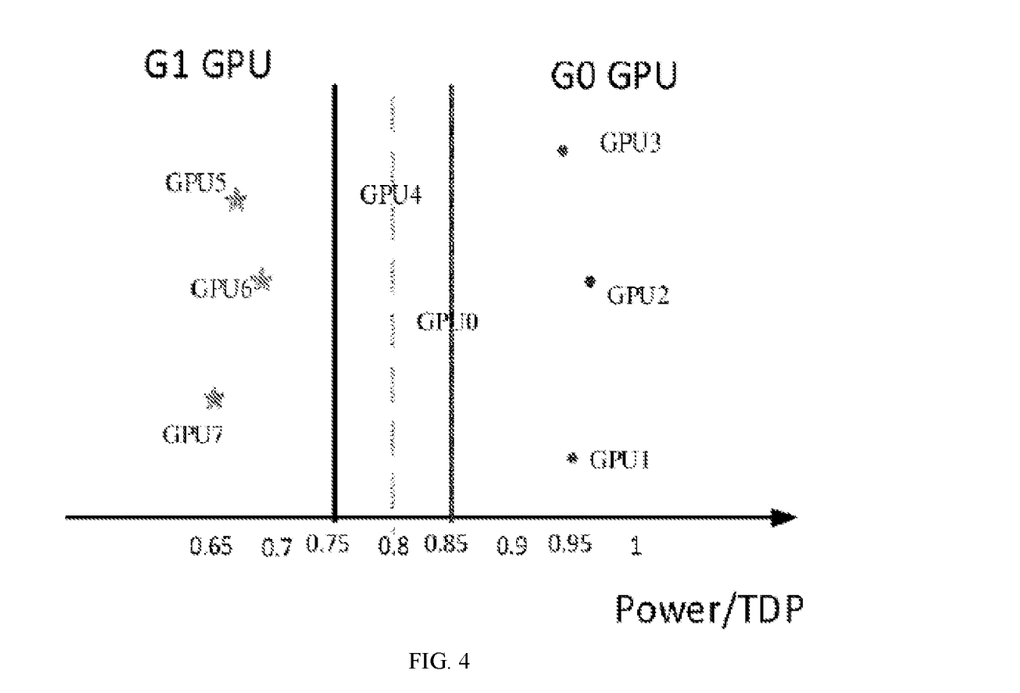
FIG. 4 is a schematic diagram illustrating grouping disclosed in the present application.

It should be noted that a grouping way and the number of groups obtained by grouping may be flexibly determined according to an actual condition. Three grouping ways will be introduced below. In a first grouping way, a user submits a grouping instruction through a human-computer interaction interface or inputs a grouping instruction (such as an intelligent platform management interface (IPMI) instruction) through a command line window, and the AI computing node performs grouping according to the grouping instruction. In a second grouping way, a boundary (i.e. an optimal power value) is set, and all the computing chips are divided into two groups based on the boundary. In a third grouping way (with reference to FIG. 4), a buffer section is set, computing chips on the left side of the buffer section are divided into a first group (high-priority group), computing chips on the right side of the buffer section are divided into a second group (low-priority group), then, it is determined whether the computing chips located in the buffer section are more similar to the first group or the second group, the computing chips located in the buffer section are divided according to the determination result, thereby avoiding the situation that GPUs with the same workload are divided into different groups by mistake due to simple segmentation. The computing chips in FIG. 4 are Graphics Processing Units (GPUs), GPUs represented by circles are divided into G0 (the first group), and GPUs represented by five-pointed stars are divided into G1 (the second group).

After the computing chips are grouped, corresponding regulation and control policies may be determined according to the grouping result, so that the energy efficiencies of the computing chips are guaranteed while the power of the computing chips is regulated and controlled.

In some embodiments, the computing chips are grouped according to the chip power values of the computing chips, and the grouping result is obtained as follows: the computing chips are grouped according to a grouping instruction acquired to obtain the grouping result; or an optimal power value in the target range is acquired, computing chips having chip power values greater than the optimal power value are divided into a first group, computing chips having chip power values not greater than the optimal power value are divided into a second group, and the first group and the second group are taken as the grouping result; or an optimal power value in the target range is acquired, a buffer section with the optimal power value as a mid-value is determined, computing chips having chip power values that are not within the buffer section and are greater than the optimal power value are divided into a first group, and computing chips having chip power values that are not within the buffer section and are not greater than the optimal power value are divided into a second group; a first power gradient for the first group, a second power gradient for the second group and chip power gradients for the computer chips in the buffer section are calculated; and a first similarity between any one of the chip power gradients and the first power gradient and a second similarity between any one of the chip power gradients and the second power gradient are calculated, in response to determining that the first similarity is greater than the second similarity, computing chips corresponding to the chip power gradients are added into the first group, in response to determining that the first similarity is less than the second similarity, computing chips corresponding to the chip power gradients are added into the second group, and the first group and the second group are taken as the grouping result.

The first power gradient for the first group may be a sequence formed by a difference of adjacent chip power values of any one of the computing chips in the first group within a preset time period (such as five seconds), of course, it may also be in other forms. The second power gradient for the second group may be a sequence formed by a difference of adjacent chip power values of any one of the computing chips in the second group within a preset time period, of course, it may also be in other forms. Each of the chip power gradients is a sequence formed by a difference of adjacent chip power values of the computing chips in the buffer section within a preset time period. The BMC polls the current sensor for many times within the preset time period, so that the plurality of corresponding chip power values may be obtained.

For example, chip power values of GPU0 at T0, T1, T2, T3 and T4 are respectively P00, P01, P02, P03 and P04, then, the chip power gradient may be $P_0$[(P01-P00),(P02-P01),(P03-P02),(P04-P03)]. If the GPUs located in the buffer section and the GPS on the right side of the buffer section have great power differences, they may be regarded to have different workloads, and therefore, the GPUs located in the buffer section are divided into G1.

With reference to FIG. 4, assuming that all GPUs falling within the buffer section are located on the left side of the boundary, all GPUs located in the buffer section may be directly added into G1. Assuming that all GPUs falling within the buffer section are located on the right side of the boundary, all GPUs located in the buffer section may be directly added into G0. Assuming that all GPUs falling within the buffer section are located on two sides of the boundary, the following steps are performed: the first power gradient for the first group, the second power gradient for the second group, and the chip power gradients for the computer chips in the buffer section are calculated, and the first similarity between any one of the chip power gradients and the first power gradient and the second similarity between any one of the chip power gradients and the second power gradient are calculated, in response to determining that the first similarity is greater than the second similarity, computing chips corresponding to the chip power gradients are added into the first group, in response to determining that the first similarity is less than the second similarity, computing chips corresponding to the chip power gradients are added into the second group, and the first group and the second group are taken as the grouping result.

Of course, for all the GPUs falling within the buffer section, the following steps may be directly performed: the first power gradient for the first group, the second power gradient for the second group, and the chip power gradients for the computer chips in the buffer section are calculated, and the first similarity between any one of the chip power gradients and the first power gradient and the second similarity between any one of the chip power gradients and the second power gradient are calculated, in response to determining that the first similarity is greater than the second similarity, computing chips corresponding to the chip power gradients are added into the first group, in response to determining that the first similarity is less than the second similarity, computing chips corresponding to the chip power gradients are added into the second group, and the first group and the second group are taken as the grouping result gradient for the first group gradient for the second group.

At S103, in response to the node power value being greater than a power capping value, a power regulation and control policy corresponding to the grouping result is queried, and power limit values of the computing chips are regulated according to the power regulation and control policy, such that the sum of all the power limit values is in a target range.

The power regulation and control policy is preset on the basis of the target range, and the target range is used for regulating and controlling energy efficiency values of the computing chips in the AI computing node. If the node power value is greater than the power capping value, a regulation and control portion of a power regulation and control function is started to regulate the power limit values of the computing chips.

In some embodiments, the target range is determined as follows: energy efficiency values of any one of the computing chips in the AI computing node under different chip power values are acquired by a performance benchmark test tool (such as a SGEMM); the computing chips in the AI computing node are identical; ratios of the energy efficiency values to a thermal design power (TDP) energy efficiency value are calculated; and energy efficiency values corresponding to the ratios greater than a preset threshold are added into an energy efficiency regulation and control section, and chip power values corresponding to the energy efficiency regulation and control section are determined as the target range.

TDP is thermal design power and refers to a power value during full operation of chips, a ratio of performance data measured, under this power value, by the performance benchmark test tool to this power value is the TDP energy efficiency value. That is, the TDP energy efficiency value is equal to performance data measured under the TDP/TDP. An energy efficiency value W of any one of the computing chips under the chip power value U is equal to the performance data measured under the chip power value U/the chip power value U.

Figure 5:
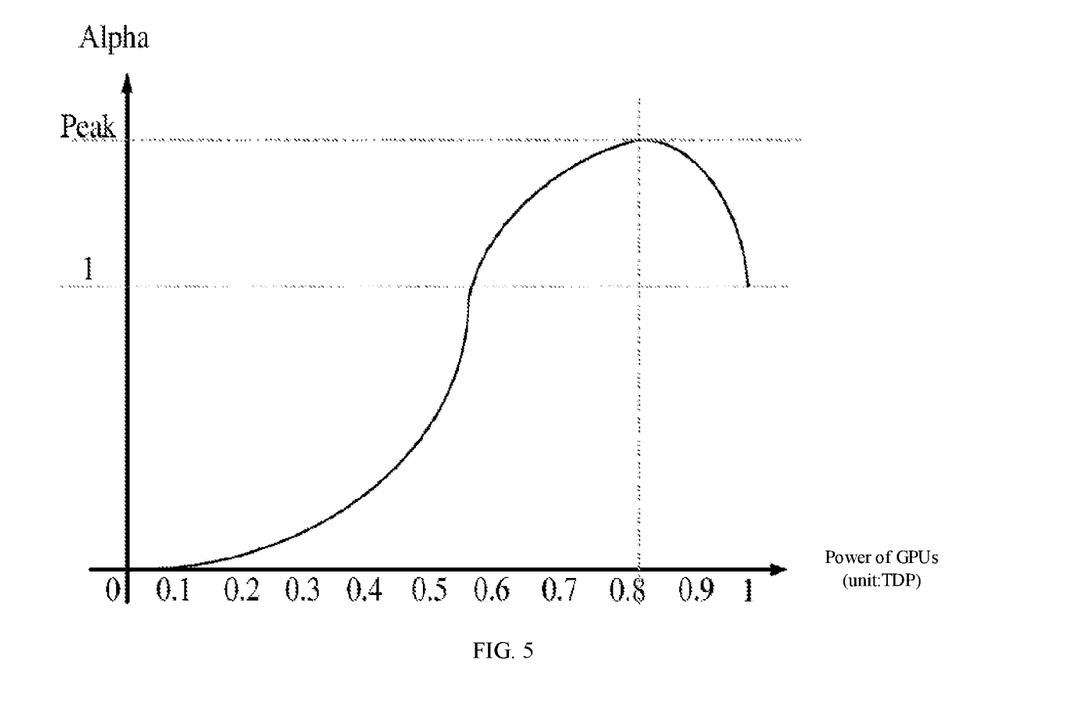
FIG. 5 is a schematic diagram illustrating a relationship between an energy efficiency and power disclosed in the present application.

For example, the energy efficiency values of a certain computing chip in the AI computing node under different chip power values are A, B, C and D, a TDP energy efficiency value of this computing chip is X, then, ratios A/X, B/X, C/X and D/X may be obtained, and these ratios may form a curve graph as shown in FIG. 5. In FIG. 5, the target range is 0.6TDP to 1TDP. It may be seen from FIG. 5 that the highest point of a curve may be reached at 0.8TDP, which demonstrates that the energy efficiency value of the chip is maximum at 0.8TDP, and therefore, 0.8TDP is the optimal power value in the target range.

In order to achieve a higher energy efficiency on the AI computing node after the power is regulated and controlled, the target range corresponding to the computing chips in the AI computing node may be pre-calculated, the target range is a power range corresponding to the computing chips, in which the power is regulable and controllable, the power of the computing chips is kept within this range, and thus, the energy efficiencies thereof may also be kept in a better state. Generally, the computing chips in the AI computing node are identical, and therefore, the target range may be determined on the basis of any one of the computing chips.

As shown in FIG. 5, when Alpha>1, the target range is 0.6TDP to 1TDP, and the power of the computing chips is regulated and controlled in this range, and thus, the energy efficiency of the AI computing node may be kept in a better state. It should be noted that a power regulation and control goal is to reduce n×(TDP−Ppeak) from the maximum power of the AI computing node, where n is the number of the computing chips in the AI computing node, and Ppeak (i.e. 0.8TDP) is power of single corresponding computing chip when the Alpha is the maximum value. With an AI computing node including eight 250 W NVIDIA V100 GPUs as an example, i.e. TDP=250 W, the maximum reducible power is 8×(250−0.8×250)W=400 W, and it is assumed that the maximum power of the AI computing node is 3100 W, then the minimum power value may be regulated to 2700 W.

In some embodiments, the computing chips are GPUs, NPUs (Neural-network Processing Units), FPGAs (Field-Programmable Gate Arrays) or ASICs (Application Specific Integrated Circuits).

It is thus clear that, in an embodiment of the present application, when the node power value of the AI computing node is greater than the warning power value, chip power values of computing chips in the AI computing node are acquired by the BMC; then, the computing chips are grouped according to the chip power values of the computing chips to obtain a grouping result; and finally, a power regulation and control policy corresponding to the grouping result is queried, and power limit values of the computing chips are regulated according to the power regulation and control policy, such that the sum of all the power limit values is in the target range, where the power regulation and control policy is preset on the basis of the target range, and the target range is used for regulating and controlling energy efficiency values of the computing chips in the AI computing node. Therefore, by regulating the power limit values of the computing chips according to the power regulation and control policy, not only is the power of the computing chips regulated and controlled, but also the energy efficiency values of the computing chips may be further effectively regulated and controlled, and thus, the energy efficiency of the AI computing node is guaranteed.

Figure 6:
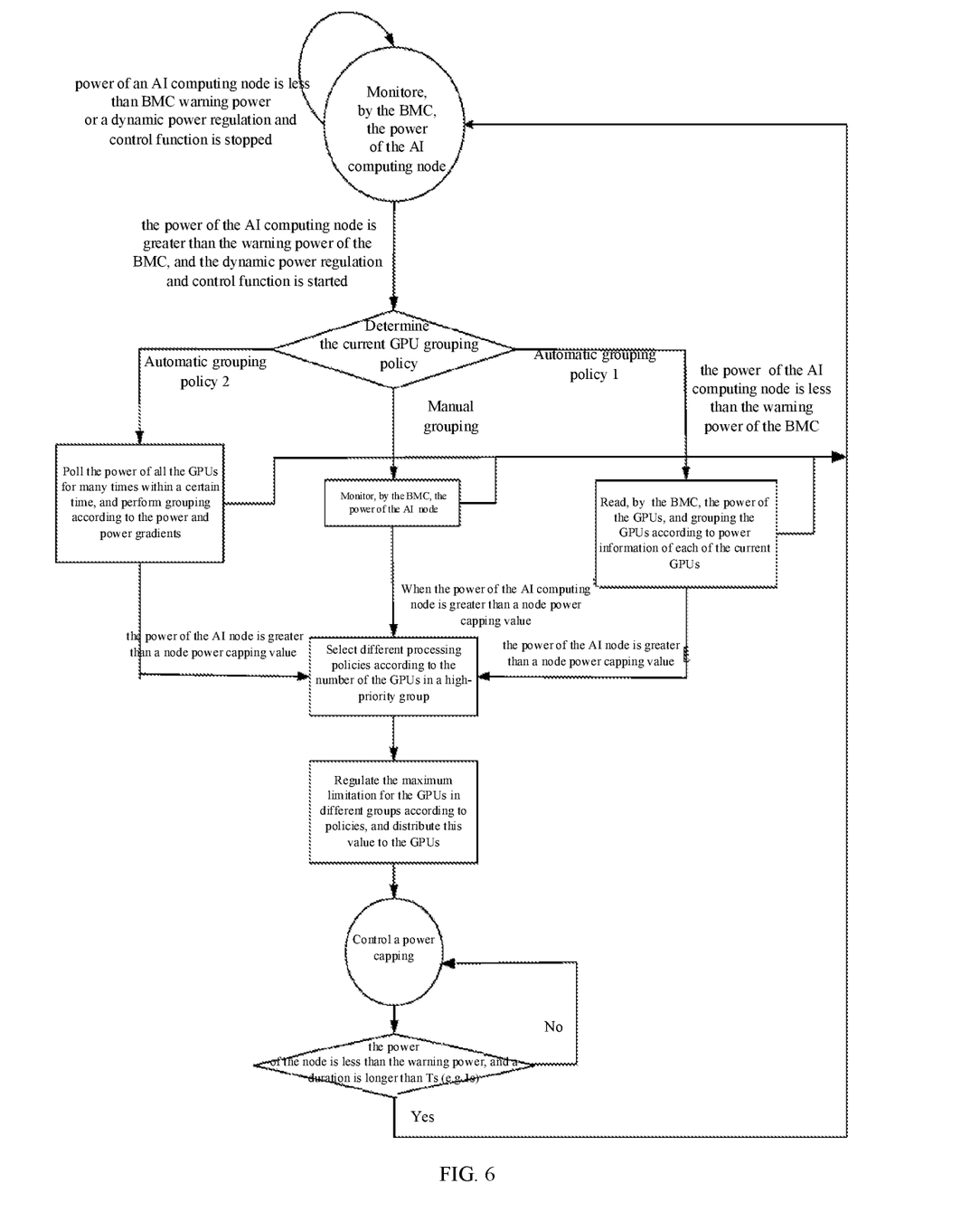
FIG. 6 is a flow chart of another power regulation and control method disclosed in the present application.

With reference to FIG. 6, in an embodiment of the present application, the node power value is monitored in real time by the BMC, and if the node power value is greater than the warning power value, a power regulation and control function is started; then, a grouping policy is determined for grouping; and then, when the node power value is greater than the power capping value, regulation and control are performed according to a high-priority group and a low-priority group obtained after grouping as well as the corresponding power regulation and control policy. FIG. 6 illustrates three grouping policies which may refer to relevant introductions in the above-mentioned embodiments for details.

In the present embodiment, the power regulation and control policy is shown in table 1.

TABLE 1

| Number of GPUs in high-priority group G0 | Number of GPUs in lower-priority group G1 | Power limit values of GPUs in G0 | Power limit values of GPUs in G1 |
| --- | --- | --- | --- |
| 8 | 0 | 0.8*TDP | — |
| 7 | 1 | 0.8*TDP | 0.8*TDP |
| 6 | 2 | 0.9*TDP | 0.6*TDP |
| 5 | 3 | 0.9*TDP | 0.6*TDP |
| 4 | 4 | TDP | 0.6*TDP |
| 3 | 5 | TDP | 0.6*TDP |
| 2 | 6 | TDP | 0.6*TDP |
| 1 | 7 | TDP | 0.6*TDP |
| 0 | 8 | — | 0.6*TDP |

In table 1, when there are eight GPUs in G0 and no GPUs in G1, the power of the eight GPUs in G0 is limited as 0.8*TDP; when there are six GPUs in G0 and two GPUs in G1, the power of the six GPUs in G0 is limited as 0.9*TDP, and the power of the two GPUs in G1 is limited as 0.6*TDP; when there are four GPUs in G0 and four GPUs in G1, the power of the four GPUs in G0 is limited as TDP, and the power of the four GPUs in G1 is limited as 0.6*TDP, where 0.9*TDP, 0.8*TDP and 0.6*TDP are merely examples.

Further, a manual grouping result may refer to table 2, and it is assumed that the AI computing node includes eight computing chips from GPU0 to GPU7 in total, wherein √ represents that the GPUs belong to G0 or G1.

TABLE 2

| | High-priority group G0 | Lower-priority group G1 |
| --- | --- | --- |
| GPU0 | ✓ | |
| GPU1 | | ✓ |
| GPU2 | ✓ | |
| GPU3 | ✓ | |
| GPU4 | | ✓ |
| GPU5 | ✓ | |
| GPU6 | | ✓ |
| GPU7 | | ✓ |

The grouping result in table 2 shows that there are four GPUs in G0 and four GPUs in G1, and the corresponding regulation and control policy may be found in table 1: the power of the GPUs in G0 is not limited, and the power of the GPUs in G1 is limited as 60%*TDP.

Accordingly, it is assumed that there are six GPUs in G0 and two GPUs in G1, as shown in table 1, the power of the GPUs in G0 is limited as 90%*TDP, and the power of the GPUs in G1 is limited as 60%*TDP. It is assumed that there are seven GPUs in G0 and one GPU in G1, as shown in table 1, the power of the GPUs in G0 and G1 is limited as 80%*TDP.

It should be noted that existing cabinets are generally lower in power supply capacity, while power of AI computing nodes is higher. Therefore, it is necessary to reduce the power of the AI computing nodes to satisfy requirements of Power Distribution Units (PDUs) of the cabinets. A plurality of AI computing nodes may be placed on one cabinet. Specifically, the PDU of the cabinet generally adopts an interface C13-C14, it is required by the domestic safety regulations that the highest continuous flow of the interface C13-C14 is not allowed to exceed 10 A, and the AI computing nodes need to adopt 2200 W or higher high-power PSUs (Power Supply Units) due to high power, for such PSU, an interface C19-C20 (16 A) is needed. It is difficult to upgrade the PDUs on a large scale. If a C19-C14 power cable is used, the continuous flow may exceed 10 A, which does not satisfy the requirements of the domestic safety regulations. It is thus clear that the power of the AI computing nodes has to be reduced to conform to the power supply capacity of the cabinet. After the power of the AI computing nodes is reduced, the number of the AP computing nodes placed on one cabinet may also be increased, so that the density of the cabinet is increased.

According to the present embodiment, the power of the AI computing node may be reduced, meanwhile, the AI computing node may be kept in a better operating state, and the energy efficiency thereof is increased. By regulating and controlling the power of the GPUs within a certain range in an out-of-band way, the high energy efficiency operation of the AI computing node is guaranteed.

A power regulation and control apparatus provided in an embodiment of the present application will be introduced below. The power regulation and control device described hereinafter may refer to the power regulation and control method described above.

Figure 7:
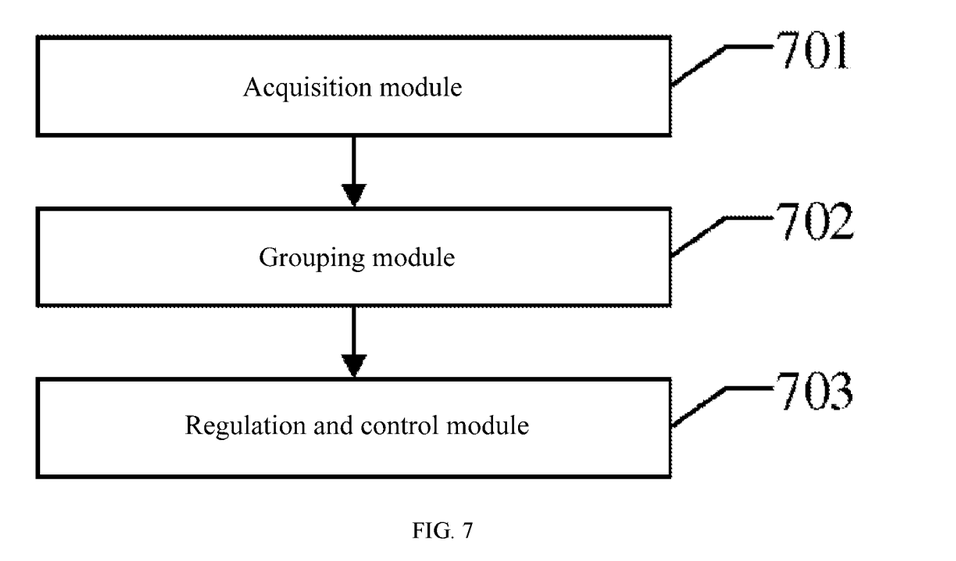
FIG. 7 is a schematic diagram illustrating a power regulation and control apparatus disclosed in the present application.

With reference to FIG. 7, and embodiment of the present application discloses a power regulation and control apparatus, including:

an acquisition module 701, configured to, in response to a node power value of an AI computing node being greater than a warning power value, acquire, by a BMC, chip power values of computing chips in the AI computing node;

a grouping module 702, configured to group the computing chips according to the chip power values of the computing chips, and obtain a grouping result; and a regulation and control module 703, configured to, in response to the node power value being greater than a power capping value, query a power regulation and control policy corresponding to the grouping result, and regulate power limit values of the computing chips according to the power regulation and control policy, such that the sum of all the power limit values is in a target range, where the warning power value is less than the power capping value; and the power regulation and control policy is preset on the basis of the target range, and the target range is used for regulating and controlling energy efficiency values of the computing chips in the AI computing node.

In some embodiments, the power regulation and control apparatus further includes:

a monitoring module, configured to monitor, by the BMC, the node power value in real time, and in response to the node power value being greater than the warning power value, start a power regulation and control function.

In some embodiments, the monitoring module is particularly configured to:

control the BMC to monitor the node power value through a PMBUS.

In some embodiments, the acquisition module is particularly configured to:

read, by the BMC, current values of the computing chips in the AI computing node to obtain the corresponding chip power values.

In some embodiments, the grouping module includes one of a first grouping unit, a second grouping unit and a third grouping unit.

The first grouping unit is configured to group the computing chips according to an acquired grouping instruction to obtain the grouping result.

The second grouping unit is configured to: acquire an optimal power value in the target range, divide computing chips having chip power values greater than the optimal power value into a first group, divide computing chips having chip power values not greater than the optimal power value into a second group, and take the first group and the second group as the grouping result.

The third grouping unit is configured to: acquire an optimal power value in the target range, determine a buffer section having the optimal power value as a mid-value, divide computing chips having the chip power values that are not within the buffer section and are greater than the optimal power value into a first group, and divide computing chips having the chip power values that are not within the buffer section and are not greater than the optimal power value into a second group; calculate a first power gradient for the first group, a second power gradient for the second group, and chip power gradients for the computer chips in the buffer section; and calculate a first similarity between any one of the chip power gradients and the first power gradient and a second similarity between any one of the chip power gradients and the second power gradient, in response to determining that the first similarity is greater than the second similarity, add computing chips corresponding to the chip power gradients into the first group, in response to determining that the first similarity is less than the second similarity, add computing chips corresponding to the chip power gradients into the second group, and take the first group and the second group as the grouping result.

In some embodiments, the target range is determined as follows:

energy efficiency values of any one of the computing chips in the AI computing node under different chip power values are acquired by a performance benchmark test tool; where the computing chips in the AI computing node are identical;

ratios of the energy efficiency values to a TDP (Thermal Design Power) energy efficiency value are calculated; and energy efficiency values corresponding to the ratios greater than a preset threshold are added into an energy efficiency regulation and control section, and chip power values corresponding to the energy efficiency regulation and control section are determined as the target range.

In some embodiments, the computing chips are GPUs, NPUs, FPGAs or ASICs.

More specific working processes of the modules and the units in the present embodiment may refer to the corresponding contents disclosed in the above-mentioned embodiment, the descriptions thereof are omitted herein.

It is thus clear that the present embodiment provides a power regulation and control apparatus, by which the power of the AI computing node may be reduced, meanwhile, the AI computing node keeps in a better operating state, and the energy efficiency thereof is increased.

A power regulation and control device provided in an embodiment of the present application will be introduced below. The power regulation and control device described hereinafter may refer to the power regulation and control method and device described above.

Figure 8:
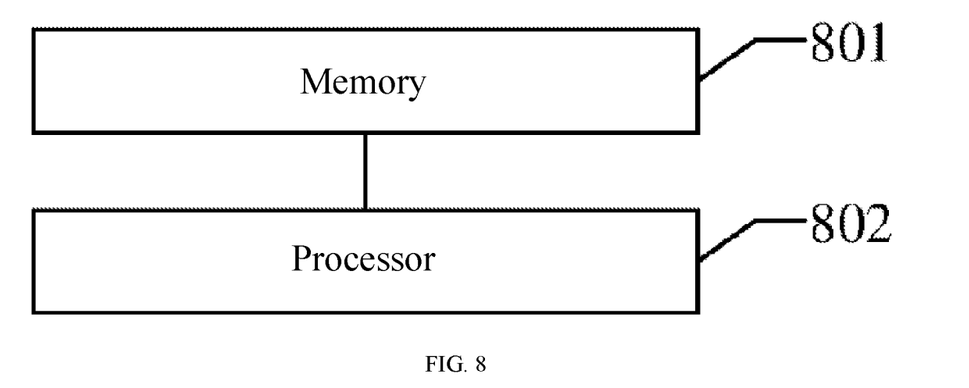
FIG. 8 is a schematic diagram illustrating a power regulation and control device disclosed in the present application.

With reference to FIG. 8, an embodiment of the present application discloses a power regulation and control device, including:

a memory 801 configured to store a computer program; and a processor 802 configured to execute the computer program to implement the method disclosed in any above-mentioned embodiment.

A readable storage medium provided in an embodiment of the present application will be introduced below. The readable storage medium described hereinafter may refer to the power regulation and control method, apparatus and device described above.

A readable storage medium used for storing a computer program, wherein the computer program, when executed by a processor, implements the power regulation and control method disclosed in the above-mentioned embodiment. Specific steps of this method may refer to the corresponding contents disclosed in the above-mentioned embodiment, the descriptions thereof are omitted herein.

"First", "second", "third", "fourth" and the like as used in the present application are used to distinguish similar objects and not necessarily to describe a specific order or sequence. It is to be understood that the terms as used are interchangeable under appropriate circumstances such that the embodiments described herein can be practiced in sequences other than those illustrated or described herein. Furthermore, the terms "comprising" and "having", as well as any variations thereof, are intended to cover a non-exclusive inclusion, e.g.

a process, method or apparatus comprising a series of steps or elements is not necessarily limited to those steps or elements explicitly listed, but may include other steps or elements not explicitly listed or inherent to the process, method or apparatus.

It should be noted that the terms such as "first", "second" are for descriptive purposes only, and should not be understood as indicating or implying their relative importance or implicitly indicating the number of indicated technical features. Thus, the features defined as "first" and "second" may explicitly or implicitly include at least one of these features. In addition, the technical solutions of the various embodiments can be combined with each other, but it must be based on the realization of those skilled in the art. When the combination of technical solutions is contradictory or cannot be realized, it should be considered that the combination of technical solutions does not exist, nor within the scope of protection required by the present application.

Various embodiments in the specification are described in a progressive manner, each embodiment focuses on the difference from other embodiments, and the same and similar parts of various embodiments can be referred to each other.

The steps of the methods or algorithms described in connection with the embodiments disclosed herein may be directly implemented by hardware, software modules executed by a processor, or a combination of both. Software modules can be placed in random access memory (RAM), internal memory, read-only memory (ROM), electrically programmable ROM, electrically erasable programmable ROM, registers, hard disk, removable disk, CD-ROM, or any other storage medium known in the technical field.

Herein, specific examples are used to illustrate the principles and implementation methods of the present application. The descriptions of the above embodiments are only used to help understand the method and core idea of the application; meanwhile, for those skilled in the art, there will be changes in the specific implementation and scope of application based on the core idea of the application. In summary, the content of the specification should not be construed as limiting the present application.

The invention claimed is:

1. A power regulation and control method, comprising:
in response to a node power value of an artificial intelligence (AI) computing node being greater than a warning power value, acquiring, by a baseboard management controller (BMC), chip power values of computing chips in the AI computing node;
obtaining a grouping result by grouping, according to the chip power values of the computing chips, the computing chips; and
in response to the node power value being greater than a power capping value, querying a power regulation and control policy corresponding to the grouping result, and regulating power limit values of the computing chips according to the power regulation and control policy, such that a sum of all the power limit values is in a target range, wherein the warning power value is less than the power capping value, the power regulation and control policy is preset on the basis of the target range, and the target range is used for regulating and controlling energy efficiency values of the computing chips in the AI computing node;
wherein the obtaining a grouping result by grouping, according to the chip power values of the computing chips, the computing chips comprises:
acquiring an optimal power value in the target range, determining a buffer section having the optimal power value served as a mid-value, dividing computing chips having chip power values that are not in the buffer section and are greater than the optimal power value into a first group, and dividing computing chips having chip power values that are not in the buffer section and not greater than the optimal power value into a second group;
calculating a first power gradient for the first group, a second power gradient for the second group, and chip power gradients for the computer chips in the buffer section; and
calculating a first similarity between any one of the chip power gradients and the first power gradient and a second similarity between the chip power gradient and the second power gradient, in response to determining that the first similarity is greater than the second similarity, adding a computing chip corresponding to the chip power gradient into the first group, in response to determining that the first similarity is less than the second similarity, adding the computing chip corresponding to the chip power gradient into the second group, and taking the first group and the second group as the grouping result.

2. The power regulation and control method according to claim 1, wherein before acquiring, by a baseboard management controller (BMC), chip power values of computing chips in the AI computing node, the method further comprises:
monitoring, by the BMC, the node power value in real time, and in response to the node power value being greater than the warning power value, starting a power regulation and control function.

3. The power regulation and control method according to claim 2, wherein the monitoring, by the BMC, the node power value in real time comprises:
controlling the BMC to monitor the node power value through a power management bus (PMBUS).

4. The power regulation and control method according to claim 1, wherein the acquiring, by a baseboard management controller (BMC), chip power values of computing chips in the AI computing node comprises:
obtaining respective chip power values by reading current values of the computing chips in the AI computing node by the BMC.

5. The power regulation and control method according to claim 4, wherein the obtaining respective chip power values by reading current values of the computing chips in the AI computing node by the BMC comprises:
polling, by the BMC, current sensors corresponding to the computing chips for many times within a preset time period to obtain corresponding chip power values.

6. The power regulation and control method according to claim 1, wherein the target range is determined by:
acquiring, by a performance benchmark test tool, energy efficiency values of any one of the computing chips in the AI computing node under different chip power values, wherein the computing chips in the AI computing node are identical;
calculating a ratio of each of the energy efficiency values to a thermal design power (TDP) energy efficiency value; and
adding energy efficiency value corresponding to the ratio greater than a preset threshold into an energy efficiency regulation and control section, and determining chip power values corresponding to the energy efficiency regulation and control section as the target range.

7. The power regulation and control method according to claim 6, wherein the computing chip is a graphics processing unit (GPU), a neural network processing unit (NPU), a field programmable gate array (FPGA) or an application specific integrated circuit (ASIC).

8. The power regulation and control method according to claim 1, wherein the first power gradient for the first group is a sequence formed by a difference of adjacent chip power values of any one of the computing chips in the first group within a preset time period; the second power gradient for the second group is a sequence formed by a difference of adjacent chip power values of any one of the computing chips in the second group within a preset time period; each of the chip power gradients is a sequence formed by a difference of adjacent chip power values of the computing chips in the buffer section within a preset time period.

9. The power regulation and control method according to claim 1, wherein the AI computing node is a device for running a machine learning algorithm, and comprises a plurality of computing chips.

10. The power regulation and control method according to claim 1, wherein the node power value is an actual total power value of the AI computing node, the warning power value and the power capping value are both preset values.

11. A power regulation and control device, comprising:
a memory configured to store a computer program; and
a processor configured to execute the computer program to:
in response to a node power value of an artificial intelligence (AI) computing node being greater than a warning power value, acquire, by a baseboard management controller (BMC), chip power values of computing chips in the AI computing node;
obtain a grouping result by grouping, according to the chip power values of the computing chips, the computing chips; and
in response to the node power value being greater than a power capping value, query a power regulation and control policy corresponding to the grouping result, and regulate power limit values of the computing chips according to the power regulation and control policy, such that a sum of all the power limit values is in a target range, wherein the warning power value is less than the power capping value, the power regulation and control policy is preset on the basis of the target range, and the target range is used for regulating and controlling energy efficiency values of the computing chips in the AI computing node;
wherein the processor is further configured to:
acquire an optimal power value in the target range, determine a buffer section having the optimal power value served as a mid-value, divide computing chips having chip power values that are not in the buffer section and are greater than the optimal power value into a first group, and divide computing chips having chip power values that are not in the buffer section and not greater than the optimal power value into a second group;
calculate a first power gradient for the first group, a second power gradient for the second group, and chip power gradients for the computer chips in the buffer section; and
calculate a first similarity between any one of the chip power gradients and the first power gradient and a second similarity between the chip power gradient and the second power gradient, in response to determining that the first similarity is greater than the second similarity, add a computing chip corresponding to the chip power gradient into the first group, in response to determining that the first similarity is less than the second similarity, add the computing chip corresponding to the chip power gradient into the second group, and take the first group and the second group as the grouping result.

12. The power regulation and control device according to claim 11, wherein the processor is further configured to:
monitor, by the BMC, the node power value in real time, and in response to the node power value being greater than the warning power value, starting a power regulation and control function.

13. The power regulation and control device according to claim 12, wherein the processor is further configured to:
control the BMC to monitor the node power value through a power management bus (PMBUS).

14. The power regulation and control device according to claim 11, wherein the processor is further configured to:
obtain respective chip power values by reading current values of the computing chips in the AI computing node by the BMC.

15. A non-transitory readable storage medium storing a computer program that, when executed by a processor, causes the processor to: in response to a node power value of an artificial intelligence (AI) computing node being greater than a warning power value, acquire, by a baseboard management controller (BMC), chip power values of computing chips in the AI computing node; obtain a grouping result by grouping, according to the chip power values of the computing chips, the computing chips; and in response to the node power value being greater than a power capping value, query a power regulation and control policy corresponding to the grouping result, and regulate power limit values of the computing chips according to the power regulation and control policy, such that a sum of all the power limit values is in a target range, wherein the warning power value is less than the power capping value, the power regulation and control policy is preset on the basis of the target range, and the target range is used for regulating and controlling energy efficiency values of the computing chips in the AI computing node; wherein the processor is further configured to: acquire an optimal power value in the target range, determine a buffer section having the optimal power value served as amid-value, divide computing chips having chip power values that are not in the buffer section and are greater than the optimal power value into a first group, and divide computing chips having chip power values that are not in the buffer section and not greater than the optimal power value into a second group; calculate a first power gradient for the first group, a second power gradient for the second group, and chip power gradients for the computer chips in the buffer section; and calculate a first similarity between any one of the chip power gradients and the first power gradient and a second similarity between the chip power gradient and the second power gradient, in response to determining that the first similarity is greater than the second similarity, add a computing chip corresponding to the chip power gradient into the first group, in response to determining that the first similarity is less than the second similarity, add the computing chip corresponding to the chip power gradient into the second group, and take the first group and the second group as the grouping result.

* * * * *